(12) United States Patent
Kim et al.

(10) Patent No.: US 11,521,399 B2
(45) Date of Patent: Dec. 6, 2022

(54) VEHICLE AND CONTROL METHOD THEREOF

(71) Applicants: Hyundai Motor Company, Seoul (KR); Kia Motors Corporation, Seoul (KR)

(72) Inventors: Jihoon Kim, Whasung-Si (KR); Sungik Bae, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 425 days.

(21) Appl. No.: 16/700,672

(22) Filed: Dec. 2, 2019

(65) Prior Publication Data

US 2021/0012123 A1     Jan. 14, 2021

(30) Foreign Application Priority Data

Jul. 8, 2019    (KR) .................... 10-2019-0082046

(51) Int. Cl.
| | |
|---|---|
| *G06V 20/58* | (2022.01) |
| *B60R 11/04* | (2006.01) |
| *B60Q 1/32* | (2006.01) |
| *B60R 1/12* | (2006.01) |
| *B60Q 1/00* | (2006.01) |
| *B60R 11/00* | (2006.01) |

(52) U.S. Cl.
CPC ......... *G06V 20/586* (2022.01); *B60Q 1/0017* (2013.01); *B60Q 1/32* (2013.01); *B60R 1/1207* (2013.01); *B60R 11/04* (2013.01); *G06V 20/58* (2022.01); *B60R 2001/1253* (2013.01); *B60R 2011/004* (2013.01)

(58) Field of Classification Search
CPC .. B60Q 1/0017; B60Q 1/0023; B60Q 1/2665; B60Q 1/32; B60Q 1/48; B60Q 9/00–005; B60Q 2400/40; B60R 1/06; B60R 1/12; B60R 1/1207; B60R 11/04; B60R 2001/1253; B60R 2011/004; B60R 2300/103; B60W 40/10; B60W 50/14; B60W 2420/42; G06V 10/141–145; G06V 10/60; G06V 10/754; G06V 20/58–586

See application file for complete search history.

(56) References Cited

U.S. PATENT DOCUMENTS

| | | | | |
|---|---|---|---|---|
| 8,749,404 B2* | 6/2014 | Augst | ................... | G06V 20/58 |
| | | | | 340/436 |
| 2005/0243172 A1* | 11/2005 | Takano | ................... | B60R 1/12 |
| | | | | 348/148 |

FOREIGN PATENT DOCUMENTS

KR    10-2017-0070514 A    6/2017

\* cited by examiner

*Primary Examiner* — Jason M Han
(74) *Attorney, Agent, or Firm* — Morgan, Lewis & Bockius LLP

(57) ABSTRACT

Disclosed are a vehicle and a control method thereof configured for performing a vehicle control to detect lighting irradiated from a lamp at the time of vehicle parking and park the vehicle safely and accurately. The vehicle includes a lamp configured to irradiate lighting to a ground, a camera configured to photograph the lighting irradiated to the ground to obtain information on a form of the lighting of the lamp, and a controller configured to determine at least one of the form of the ground to which the lighting is irradiated and whether or not an obstacle exists on the ground to which the lighting is irradiated, based on the information on the obtained form of the lighting of the lamp.

17 Claims, 10 Drawing Sheets

VEHICLE AND CONTROL METHOD THEREOF

CROSS-REFERENCE TO RELATED APPLICATION(S)

The present application claims priority to Korean Patent Application No. 10-2019-0082046, filed on Jul. 8, 2019, in the Korean Intellectual Property Office, the entire contents of which is incorporated herein for all purposes by this reference.

BACKGROUND OF THE INVENTION

Field of the Invention

The present invention relates to a vehicle and a control method thereof, and more particularly, to a vehicle and a control method thereof capable of performing a vehicle control to detect lighting irradiated from a puddle lamp at the time of vehicle parking and park the vehicle safely and accurately.

Description of Related Art

A vehicle refers to a device capable of carrying a person or a thing to a destination while driving on a road or rails. The vehicle may be moved to various positions mainly using one or more wheels mounted on a vehicle body. Such a vehicle may include a three-wheeled or four-wheeled vehicle, a two-wheeled vehicle such as a motorcycle, a construction machine, a bicycle, a train running on rails, and the like.

In general, when parking a vehicle in a dark place, it is difficult for passengers to check the surroundings of the vehicle, which causes a great inconvenience for the passengers when getting on or off.

To the present end, when a driver and a passenger are to get on or off, a puddle lamp is used to solve the inconvenience of the driver and the passenger by illuminating the surroundings of the vehicle in advance. The puddle lamp mounted on a side mirror of the vehicle allows the driver and the passenger to ensure the view thereof when getting on or off by illuminating the ground on a driver's seat side and a passenger's seat side.

In recent years, autonomous parking of vehicles has become common, and a control for preventing a collision with another vehicle using an ultrasonic sensor, front and rear cameras, and the like during parallel parking is used. However, there is no a clear technology of how to recognize a drain way, a cliff, curb or an obstacle located on sides of the vehicle, which are most important in parallel parking.

Therefore, in recent years, the necessity of the method which may park a vehicle safely by detecting a drain way, a cliff, curb or an obstacle located on sides of the vehicle using lighting emitted from the puddle lamp during parking of the vehicle, has been increasing.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle and a control method thereof capable of parking safely and accurately by detecting the surroundings of the vehicle and warning a driver or controlling the behavior of the vehicle using the light emitted from a puddle lamp when parking the vehicle.

Additional various aspects of the present invention will be set forth in part in the description which follows and, in part, will be obvious from the description, or may be learned by practice of the present invention.

In accordance with an aspect of the present invention, a vehicle includes a lamp configured to irradiate lighting to a ground, a camera configured to photograph the lighting irradiated to the ground to obtain information on a form of the lighting of the lamp, and a controller configured to determine at least one of the form of the ground to which the lighting is irradiated and whether or not an obstacle exists on the ground to which the lighting is irradiated, based on the information on the obtained form of the lighting of the lamp.

The lamp may irradiate the lighting to the ground in a predetermined form, and the controller may be configured to determine that the form of the ground to which the lighting of a region which is not obtained is irradiated is at least one of a drain way and a cliff when the form of the obtained lighting of the lamp is a portion of a region of the predetermined form and the form of the remaining lighting region of the lighting other than the portion of the region is not obtained.

When an area of the obtained lighting of the lamp is less than or equal to a predetermined area, the controller may be configured to determine that the form of the lighting of the lamp is the portion of the region of the predetermined form.

When the form of the obtained lighting of the lamp is distorted, the controller may be configured to determine that a ground form of a distorted lighting region is at least one of curb and the obstacle and a position of the at least one of the curb and the obstacle is higher than the ground to which the lighting is irradiated.

When the form of the obtained lighting of the lamp is divided by the at least one of the curb and the obstacle and lengths of points at which the divided regions of the lighting intersect the curb or the obstacle are different from each other, the controller may be configured to determine that some regions of the lighting irradiated from the lamp are irradiated to the ground and remaining regions other than the some regions are irradiated to the curb or the obstacle so that the form of the lighting is distorted.

The controller may divide the lighting region irradiated to the ground into a predetermined number and determine a relative position of the vehicle with respect to at least one of the drain way and the cliff based on a position of a region where the form of the lighting region is not obtained among the divided regions.

The controller may divide the lighting region irradiated to the ground into a predetermined number and determine a relative position of the vehicle with respect to at least one of the curb and the obstacle based on a position of a region where the form of the lighting region is distorted among the divided regions.

When the form of the obtained lighting of the lamp coincides with the predetermined form, the controller may be configured to determine that the form of the ground to which the lighting is irradiated is a general road.

The lamp and the camera may be provided on a side mirror of the vehicle.

In accordance with another aspect of the present invention, a vehicle control method includes irradiating lighting of a lamp to a ground, photographing the lighting irradiated to the ground to obtain information on a form of the lighting of the lamp, and determining at least one of the form of the ground to which the lighting is irradiated and whether or not an obstacle exists on the ground to which the lighting is irradiated, based on the information on the obtained form of the lighting of the lamp.

The irradiating of the lighting to the ground may include irradiating the lighting to the ground in a predetermined form, and the determining of the form of the ground to which the lighting is irradiated may include determining that the form of the ground to which the lighting of a region which is not obtained is irradiated is at least one of a drain way and a cliff when the form of the obtained lighting of the lamp is a portion of a region of the predetermined form and the form of the remaining lighting region of the lighting other than the portion of the region is not obtained.

When an area of the obtained lighting of the lamp is less than or equal to a predetermined area, it may be determined that the form of the lighting of the lamp is the portion of the region of the predetermined form.

The determining of whether or not an obstacle exists on the ground to which the lighting is irradiated may include determining that when the form of the obtained lighting of the lamp is distorted, a ground form of a distorted lighting region is at least one of curb and the obstacle and a position of the at least one of the curb and the obstacle is higher than the ground to which the lighting is irradiated.

The determining that the form of the lighting is distorted may include determining that when the form of the obtained lighting of the lamp is divided by the at least one of the curb and the obstacle and lengths of points at which the divided regions of the lighting intersect the curb or the obstacle are different from each other, some regions of the lighting irradiated from the lamp are irradiated to the ground and remaining regions other than the some regions are irradiated to the curb or the obstacle so that the form of the lighting is distorted.

The vehicle control method may further include dividing the lighting region irradiated to the ground into a predetermined number, wherein a relative position of a vehicle with respect to at least one of the drain way and the cliff may be determined based on a position of a region where the form of the lighting region is not obtained among the divided regions.

The vehicle control method may further include dividing the lighting region irradiated to the ground into a predetermined number, wherein a relative position of a vehicle with respect to at least one of the drain way and the cliff may be determined based on a position of a region where the form of the lighting region may be distorted among the divided regions.

When the form of the obtained lighting of the lamp coincides with the predetermined form, it may be determined that the form of the ground to which the lighting is irradiated is a general road.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
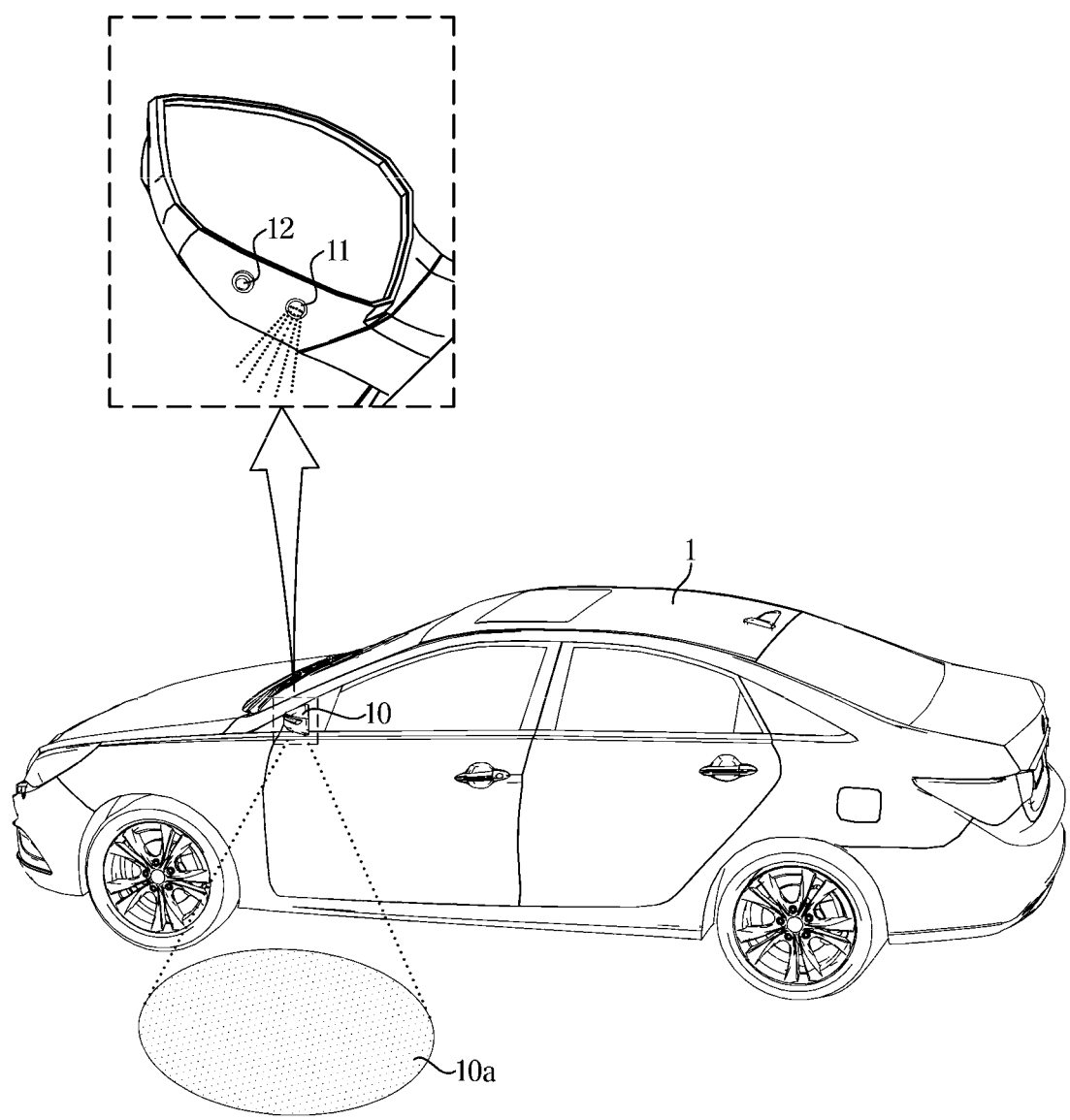
FIG. 1 is a perspective view schematically illustrating the exterior of a vehicle provided with a puddle lamp and a camera according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Like reference numerals refer to like elements throughout the specification. The present specification does not describe all the elements of the embodiments, and duplicative contents between general contents or embodiments in the technical field of the present invention of the present invention will be omitted. The terms 'part,' 'module,' 'member,' and 'block' used in the exemplary embodiment may be embodied as software or hardware, and it is also possible for a plurality of 'parts,' 'modules,' 'members,' and 'blocks' to be embodied as one component, or one 'part,' 'module,' 'member,' and 'block' to include a plurality of components according to the embodiments.

Throughout the specification, when a part is referred to as being "connected" to another part, it includes not only a direct connection but also an indirect connection, and the indirect connection includes connecting through a wireless network.

Further, when it is described that a part "includes" an element, it means that the element may further include other elements, not excluding the other elements unless specifically stated otherwise.

The terms 'first,' 'second,' etc. Are used to distinguish one element from another element, and the elements are not limited by the above-mentioned terms.

The singular forms "a," "an," and "the" include plural referents unless the context clearly dictates otherwise.

In each step, an identification sign is used for the convenience of explanation, and the identification sign does not describe the order of each step, and each step may be performed differently from the stated order unless clearly specified in the context.

Hereinafter the operating principle and embodiments of the present invention will be described with reference to the accompanying drawings.

FIG. 1 is a perspective view schematically illustrating the exterior of a vehicle provided with a puddle lamp and a camera according to an exemplary embodiment of the present invention.

Referring to FIG. 1, a side mirror 10 of a vehicle 1 may be provided with a puddle lamp 11. The puddle lamp 11 is configured to solve the inconvenience of a passenger by brightening the surroundings of the vehicle 1 in advance when the passenger of the vehicle 1 gets on or off. As illustrated in FIG. 1, the puddle lamp 11 allows a driver and a passenger to ensure the view thereof when getting on or off by irradiating a lighting 10a to the ground on a driver's seat side and a passenger's seat side.

The puddle lamp 11 may be provided on both a side mirror 10 of the driver's seat side and the side mirror 10 of the passenger's seat side, and there is no limitation on the number and installation positions of the puddle lamp 11. Furthermore, the form of a lighting 10a irradiated to the ground from the puddle lamp 11 and the area of an irradiated region may be variously implemented.

The configuration of the puddle lamp 11 includes a light source body including a light emitting diode (LED) that emits light, and an objective lens that enlarges and irradiates the light of the light source body onto the ground. The objective lens is based on irradiating light to a region as wide as possible with respect to the ground.

To contribute to the improvement of an advanced image of the vehicle 1 and the improvement of the merchandise, a logo indicating the unique product of the vehicle 1 may also be displayed on the ground when the lighting is irradiated to the ground from the puddle lamp 11.

As illustrated in FIG. 1, the side mirror 10 may be provided with a camera 12, and the camera 12 may obtain information on the form of the lighting 10a irradiated from the puddle lamp 11 by photographing the lighting 10a irradiated to the ground from the puddle lamp 11.

The camera 12 may be provided on both the side mirror 10 of the driver's seat side and the side mirror 10 of the passenger's seat side, and there is no limitation on the number and installation positions of the camera 12. Furthermore, the position at which the camera 12 is provided is not limited to the side mirror 10, and the camera 12 may be mounted at any position as long as image information may be obtained by photographing the lighting irradiated from the puddle lamp 11.

The camera 12 may include a 3D spatial recognition sensor, a radar sensor, an ultrasonic sensor, and the like. As the 3D spatial recognition sensor, a KINECT (RGB-D sensor), a structured light sensor (TOF), a stereo camera, etc. may be used, but is not limited thereto, and other devices which may function similar to the 3D spatial recognition sensor may also be included.

The camera 12 may obtain information on the form of lighting 10a irradiated to the ground by photographing the lighting 10a irradiated from the puddle lamp 11 and performing image information.

Figure 2:
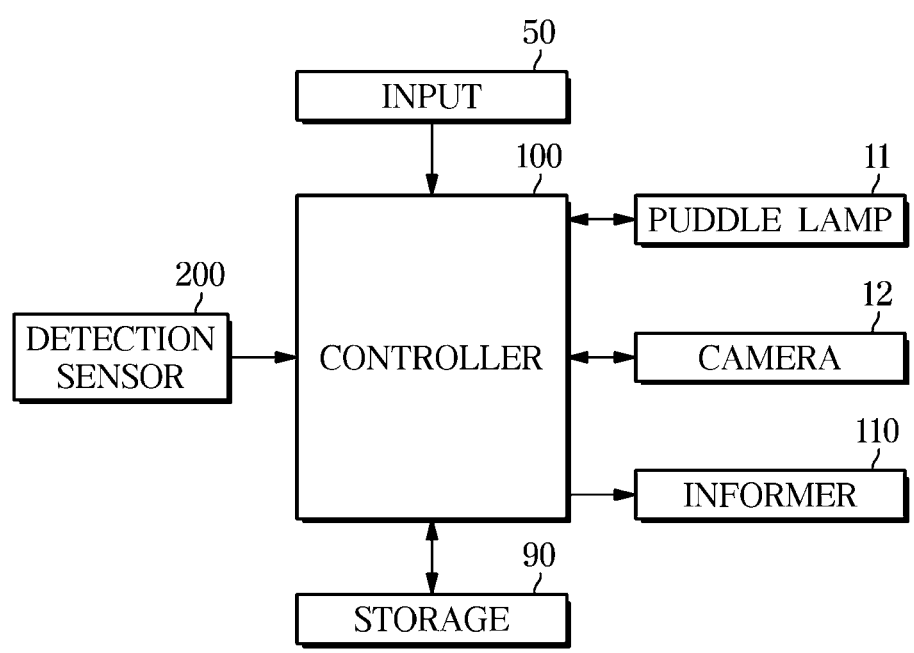
FIG. 2 is a control block diagram of the vehicle according to an exemplary embodiment of the present invention.
Figure 3:
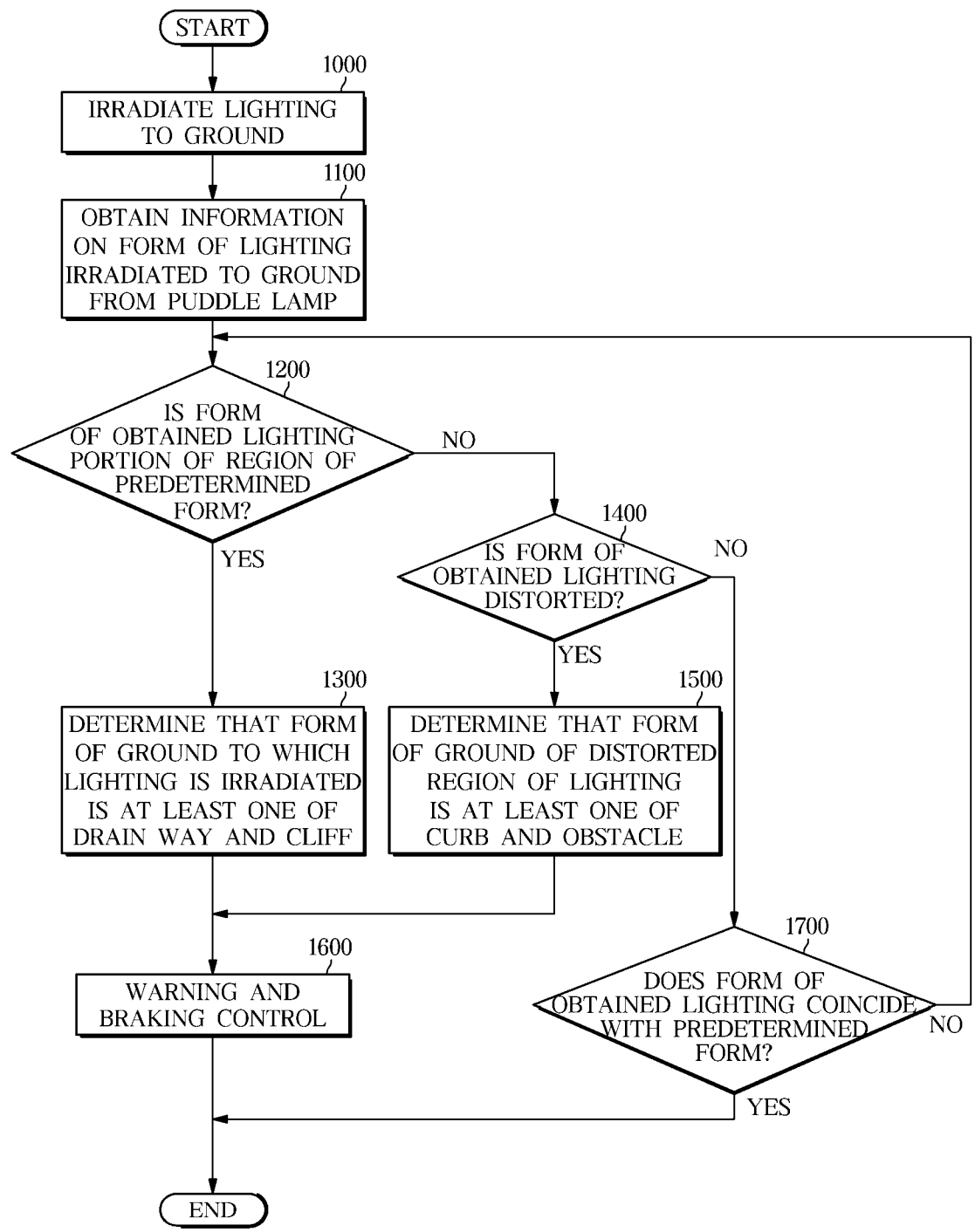
FIG. 3 is a flowchart illustrating a control flow of the vehicle according to an exemplary embodiment of the present invention.

FIG. 2 is a control block diagram of the vehicle according to an exemplary embodiment and FIG. 3 is a flowchart illustrating a control flow of the vehicle according to an exemplary embodiment of the present invention.

Referring to FIG. 2, the vehicle 1 according to an exemplary embodiment of the present invention may include an input 50 for inputting various commands related to the vehicle 1. The input 50 may be implemented by use of a physical button, a knob, a touch pad, a touch screen, a stick type manipulation device, or a track ball. The driver or passenger may control various operations of the vehicle 1 by manipulating the input 50.

The driver or passenger of the vehicle 1 according to an exemplary embodiment of the present invention may input control commands of the puddle lamp 11 and the camera 12 through the input 50, and the puddle lamp 11 and the camera 12 may operate according to the received control commands.

The vehicle 1 may include a storage 90 for storing data related to control of the vehicle 1, a controller 100 for controlling each component of the vehicle 1, an informer 110 for providing the driver with information or danger warnings related to the operation of the vehicle 1, and a detection sensor 200 for detecting an obstacle or other vehicle around the vehicle 1.

The storage 90 may store data on a control method of the vehicle 1 according to an exemplary embodiment of the present invention Information related to the form of lighting and the area of a lighting region irradiated by the puddle lamp 11 may be preset and stored in the storage 90.

The storage 90 may further store data related to an equation and a control algorithm for controlling the vehicle 1 including the puddle lamp 11 and the camera 12 according to an exemplary embodiment of the present invention, and the controller 100 may transmit a control signal for controlling the vehicle 1 according to the equation and the control algorithm.

The storage 90 may be implemented as at least one of a non-volatile memory device such as a cache, a ROM (Read Only Memory), a PROM (Programmable ROM), an EPROM (Erasable Programmable ROM), an EEPROM (Electrically Erasable Programmable ROM), and a flash memory, a volatile memory device such as a RAM (Random Access Memory), and a storage medium such as a HDD (hard disk drive) and a CD-ROM, but is not limited thereto.

The detection sensor 200 may detect a surrounding environment of the vehicle 1 or an obstacle around the vehicle 1, and detect a parking available position by use of an ultrasonic detecting function during parking of the vehicle 1.

That is, during parking of the vehicle 1, the detection sensor 200 may recognize obstacles in the front, rear, and rear sides of the vehicle 1 and detect a collision risk. The detection sensor 200 may determine whether other vehicles or obstacles exist in the left, right, front, rear, left front side, right front side, left rear side, or right rear side by use of electromagnetic waves or laser light. For example, the detection sensor 200 may emit electromagnetic waves such as microwaves or millimeter waves, pulsed laser light, ultrasonic waves or infrared rays to the left, right, front, rear, left front side, right front side, left rear side, or right rear side, and may determine whether or not an object exists by receiving pulsed laser light, ultrasonic waves or infrared rays reflected or scattered from the object located in these directions. In the instant case, the detection sensor 200 may further determine the distance between the vehicle 1 and the obstacle, or the speed and position of another object moving by use of the time when the emitted electromagnetic wave, pulse laser light, ultrasonic wave or infrared light returns.

The related art adopts a method of detecting the position of the end portion of the driver's seat of another vehicle parked in a parking region during the autonomous parking of the vehicle 1 and parking the vehicle 1 according to the position of the driver's seat.

In the instant case, there is no problem when the size of the vehicle 1 to be parked is the same or similar to that of another vehicle which is already parked, but when the size of another vehicle is smaller than the size of the vehicle 1 to be parked, the vehicle 1 may collide with an obstacle or curb around the vehicle 1 during parking, and the wheels of the vehicle 1 may fall into a drain way, or the vehicle 1 may tilt or fall toward a cliff.

That is, the related art has adopted methods of avoiding collision with other vehicles around the parking region by use of an ultrasonic sensor, an external camera, etc. during the autonomous parking of the vehicle 1, but has not implemented a method of preventing collision by detecting obstacles such as a drain way, a cliff, curb, and the like located at the sides of the vehicle 1 when parallel parking is performed.

Hereinafter a technology for safely and accurately performing autonomous parking of the vehicle 1 by detecting lighting irradiated from the puddle lamp 11 provided in the vehicle 1 according to the vehicle 1 and a control method thereof according to an exemplary embodiment of the present invention will be described.

Figure 4:
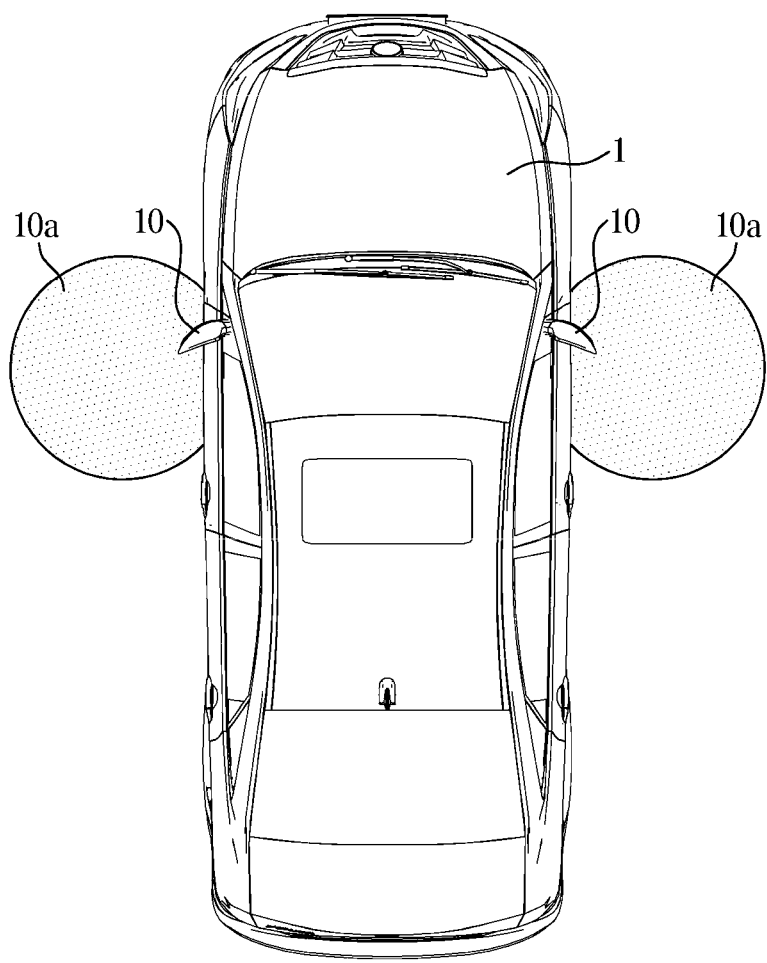
FIG. 4 illustrates lighting region irradiated to the ground from the puddle lamp according to an exemplary embodiment of the present invention.
Figure 5:
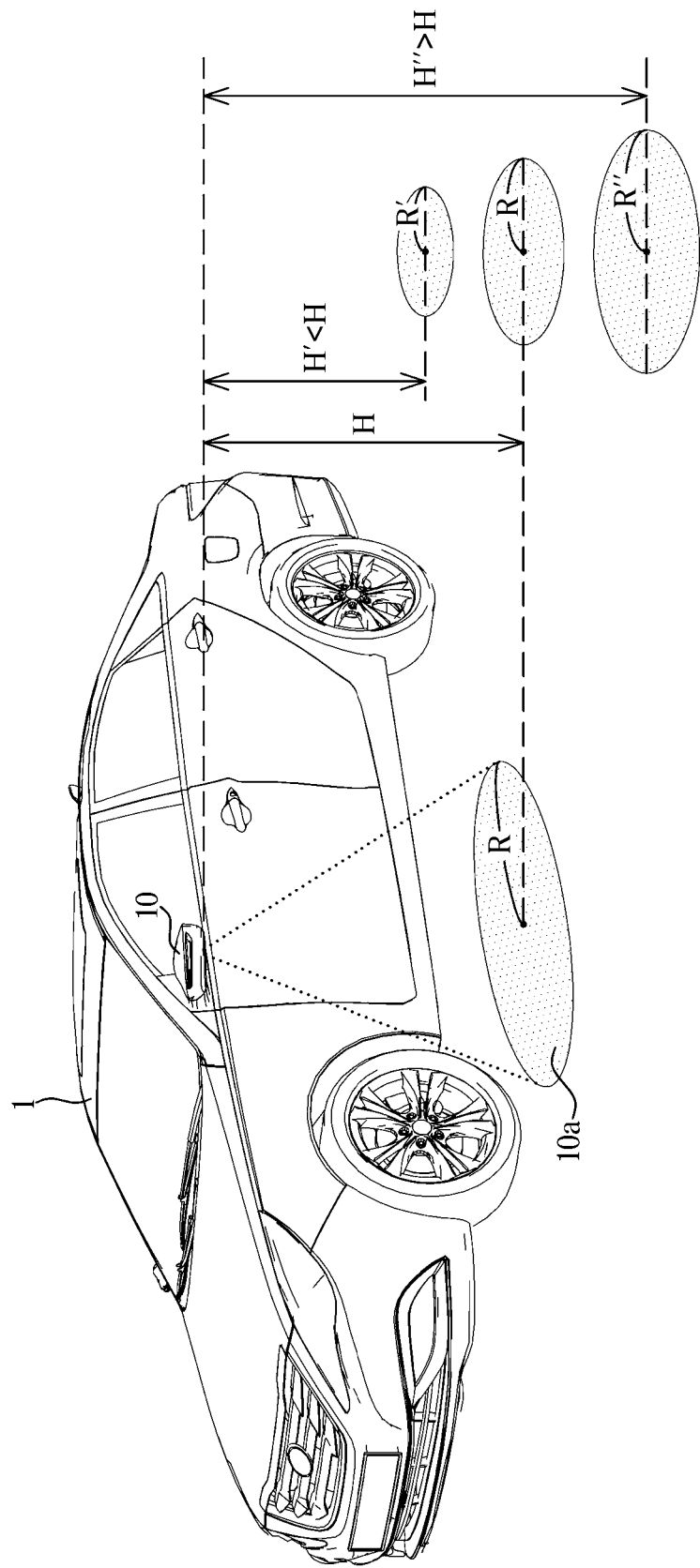
FIG. 5 illustrates that the lighting region changes when the ground to which lighting is irradiated from the puddle lamp is changed according to an exemplary embodiment of the present invention.
Figure 6:
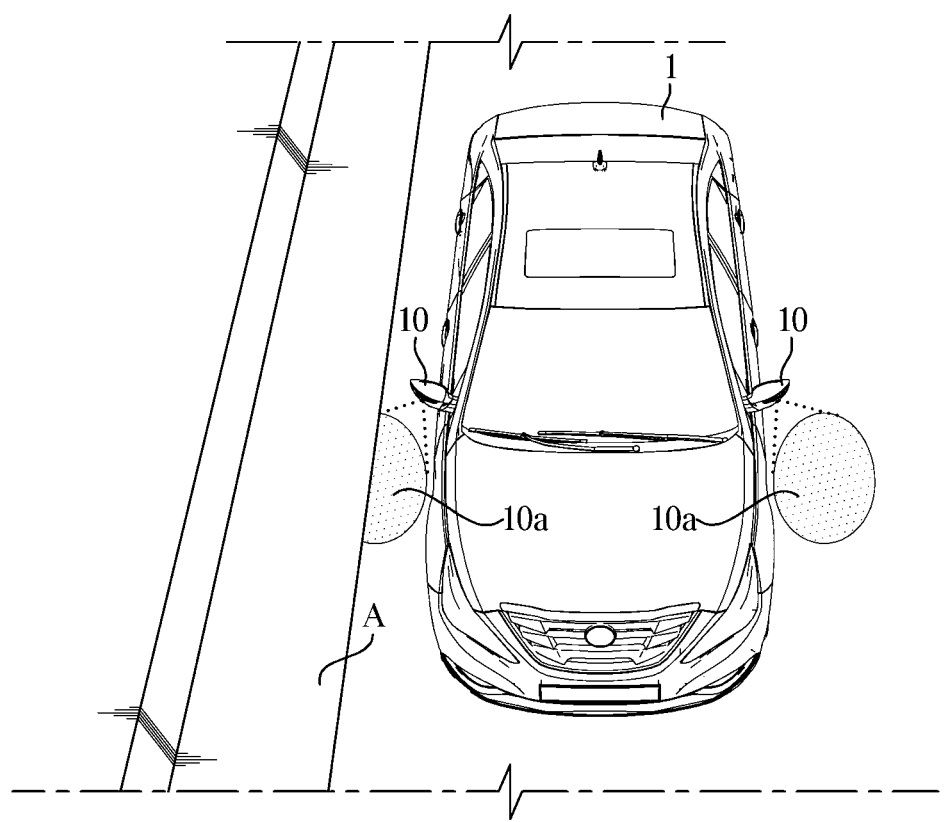
FIG. 6 illustrates the lighting region when lighting is irradiated to a drain way or a cliff from the puddle lamp according to an exemplary embodiment of the present invention.
Figure 7:
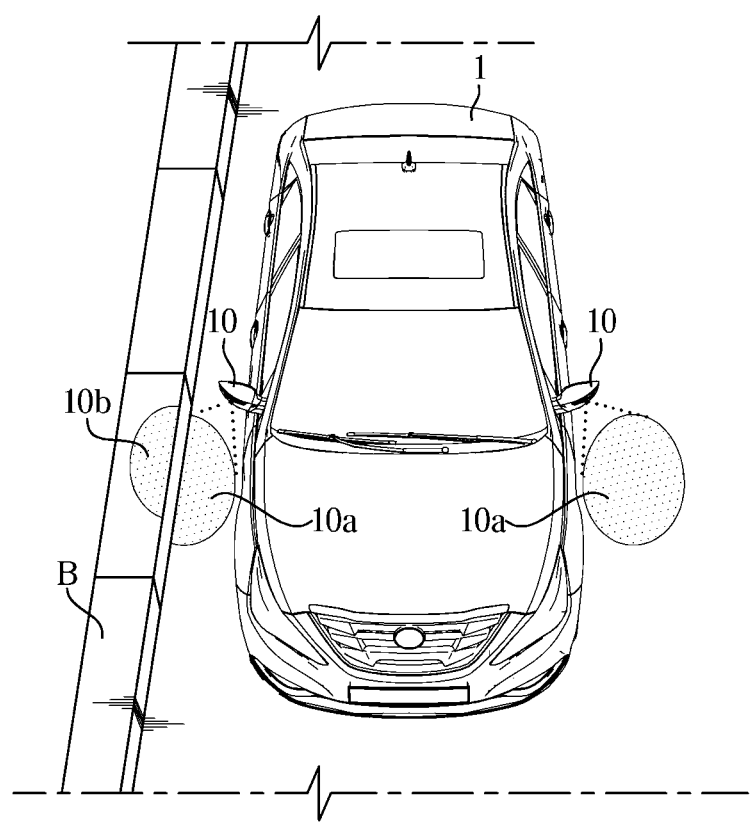
FIG. 7 illustrates the lighting region when lighting is irradiated to curb or an obstacle from the puddle lamp according to an exemplary embodiment of the present invention.

FIG. 4 illustrates lighting region irradiated to the ground from the puddle lamp according to an exemplary embodiment of the present invention, and FIG. 5 illustrates that the lighting region changes when the ground to which lighting is irradiated from the puddle lamp changes according to an exemplary embodiment of the present invention. FIG. 6 illustrates the lighting region when lighting is irradiated to a drain way or a cliff from the puddle lamp according to an exemplary embodiment of the present invention, and FIG. 7 illustrates the lighting region when lighting is irradiated to curb or an obstacle from the puddle lamp according to an exemplary embodiment of the present invention.

Referring to FIG. 3 and FIG. 4, the puddle lamp 11 provided on the side mirror 10 may irradiate the lighting 10*a* to the ground (1000), and the camera 12 may obtain information on the form of the lighting 10*a* by photographing the lighting 10*a* irradiated to the ground from the puddle lamp 11 (1100).

The puddle lamp 11 may irradiate the lighting 10*a* in a predetermined form to the ground based on the data stored in the storage 90, and the camera 12 may obtain the form of the lighting 10*a* and area information related to the ground to which the lighting 10*a* is irradiated through image recognition by photographing the lighting 10*a*.

As illustrated in FIG. 4, the lighting 10*a* irradiated from the puddle lamp 11 may be circular, or may be other than circular. There is no restriction on the form of the lighting 10*a*, but for convenience of explanation, the following description will be provided taking the case where the form of the lighting 10*a* is circular.

As illustrated in FIG. 4, when an obstacle, a drain way, or the like does not exist around the vehicle 1, the lighting 10*a* irradiated from the puddle lamp 11 may be displayed on the ground in a preset form.

The form of the lighting 10*a* may be changed differently from the predetermined form according to the form of the ground to which the lighting 10*a* is irradiated from the puddle lamp 11. That is, when the lighting 10*a* irradiated from the puddle lamp 11 is irradiated to a drain way or a cliff lower than the ground, the form of the lighting 10*a* irradiated to the drain way or the cliff may be displayed in a larger area than the predetermined form.

On the other hand, when the lighting 10*a* irradiated from the puddle lamp 11 is irradiated to curb or an obstacle higher than the ground, the form of the lighting 10*a* irradiated to the curb or the obstacle may be displayed in a smaller area than the predetermined form.

That is, referring to FIG. 5, when a height of the puddle lamp 11 provided on the side mirror 10 of the vehicle 1 is H, a distance from the puddle lamp 11 to the lighting 10*a* irradiated to the ground is also H and a radius of the lighting 10*a* becomes R.

On the other hand, as described above, when the lighting 10*a* irradiated from the puddle lamp 11 is irradiated to a drain way or a cliff, the distance from the puddle lamp 11 to the lighting 10*a* becomes H" which is greater than H, and thus the radius of the lighting 10*a* becomes R" which is greater than R.

Furthermore, when the lighting 10*a* irradiated from the puddle lamp 11 is irradiated to curb or an obstacle, the distance from the puddle lamp 11 to the lighting 10*a* becomes H' which is smaller than H. and thus the radius of the lighting 10*a* becomes R" which is smaller than R.

Referring back to FIG. 3, the camera 12 may obtain information on the form of the lighting 10*a* irradiated from the puddle lamp 11 by photographing the lighting 10*a* irradiated from the puddle lamp 11, and the controller 100 may, based on information on the form of the lighting 10*a* obtained by the camera 12, determine at least one of the form of the ground to which the lighting 10*a* is irradiated and whether or not an obstacle exists on the ground to which the lighting 10*a* is irradiated.

The controller 100 may determine whether the form of the obtained lighting 10*a* is a portion of a region of the predetermined form by comparing the form of the lighting 10*a* obtained by the camera 12 with the predetermined form (1200).

When the form of the lighting 10*a* of the puddle lamp 11 obtained by the camera 12 is a portion of a region of the predetermined form and the form of the remaining lighting region of the lighting 10*a* other than the portion of the region is not obtained, the controller 100 may determine that the form of the ground to which the lighting of the region which is not obtained is irradiated is at least one of a drain way and a cliff (1300).

As illustrated in FIG. 6, when a portion of the region of the lighting 10*a* irradiated from the puddle lamp 11 is irradiated to the ground and the remaining portion of the region is irradiated to a drain way A or a cliff A, the region of the lighting 10*a* obtained by the camera 12 may be only the region which is irradiated to the ground.

That is, the lighting 10*a* irradiated from the puddle lamp 11 to the drain way or the cliff is not obtained by the camera 12 or may be obtained as a region wider than the region of the lighting 10*a* irradiated to the ground.

When only a portion of the region of the lighting 10a irradiated from the puddle lamp 11 is obtained, the controller 100 may determine that the area of the region of the lighting 10a irradiated from the puddle lamp 11 is less than or equal to a predetermined area, and thus may determine that the form of the ground to which the lighting 10a is irradiated is at least one of the drain way A and the cliff A.

Accordingly, as the lighting 10a irradiated from the puddle lamp 11 is irradiated to the drain way A or the cliff A, the controller 100 may detect a lighting region which is not obtained by the camera 12 to detect the form of the ground around the vehicle 1.

As illustrated in FIG. 6, when at least one of the drain way A or the cliff A is positioned in the place where the vehicle 1 is to be parked, the controller 100 may prevent the wheel of the vehicle 1 from falling into at least one of the drain way A and the cliff A by warning the driver of the vehicle 1 via the informer 110 or controlling the braking of the vehicle 1 (1600).

Referring back to FIG. 3, the controller 100 may determine whether the form of the obtained lighting 10a is distorted by comparing the form of the lighting 10a obtained by the camera 12 with the predetermined form (1400).

When the form of the lighting 10a of the puddle lamp 11 obtained by the camera 12 is distorted, the controller 100 may determine that the form of the ground of the distorted region of lighting 10a is at least one of curb and the obstacle (1500) and may determine that the curb or the obstacle is higher than the ground.

As illustrated in FIG. 7, when some regions 10a of the lighting irradiated from the puddle lamp 11 are irradiated to the ground and the remaining region 10b is irradiated to curb B or an obstacle B, because the curb B or the obstacle B to which the remaining region 10b of the lighting is irradiated is higher than the height of the ground to which the some regions 10a of the lighting irradiated, the area of the remaining region 10b of the lighting is obtained to be smaller than that of the some regions 10a of the lighting obtained by the camera 12.

As illustrated in FIG. 7, when the form of the lighting irradiated from the puddle lamp 11 is divided by at least one of the curb B and the obstacle B, the lengths of the points at which the divided regions 10a and 10b of the lighting intersect the curb B or the obstacle B become different from each other.

That is, because the height of the regions 10a of a lighting irradiated to the ground from the puddle lamp 11 is different from that of the region 10b of the lighting irradiated to the curb B or the obstacle B, the controller 100 may determine that the form of the lighting of the puddle lamp 11 obtained by the camera 12 is distorted.

Accordingly, when the form of a region of the lighting obtained by the camera 12 is distorted as the lighting irradiated from the puddle lamp 11 is irradiated to the curb B or the obstacle B, the controller 100 may determine that the form of the ground to which the lighting is irradiated is the curb B or the obstacle B and thus may detect the form of the ground around the vehicle 1.

As illustrated in FIG. 7, when at least one of the curb B and the obstacle B is positioned in the place where the vehicle 1 is to be parked, the controller 100 may prevent the vehicle 1 from colliding with the curb B or the obstacle B by warning the driver of the vehicle 1 via the informer 110 or controlling the braking of the vehicle 1 (1600).

The controller 100 may determine whether the form of the lighting of the puddle lamp 11 obtained by the camera 12 coincides with the predetermined form (1700) and may, when the form of the lighting coincides with the predetermined form, determine that the form of the ground to which the lighting is irradiated is a general road.

That is, when the form of the lighting 10a irradiated to the ground from the puddle lamp 11 is the predetermined form as illustrated in FIG. 4 and the lighting region obtained by the camera 12 is a portion of the entire region 10a or the lighting form is not distorted, the controller 100 may determine that a drain way, a cliff, curb, or an obstacle does not exist around the vehicle 1.

Therefore, in the instant case, because there is no danger due to the surrounding environment when the vehicle 1 is to be parked, a warning to the driver and a braking control for the vehicle 1 are not performed.

Figure 8:
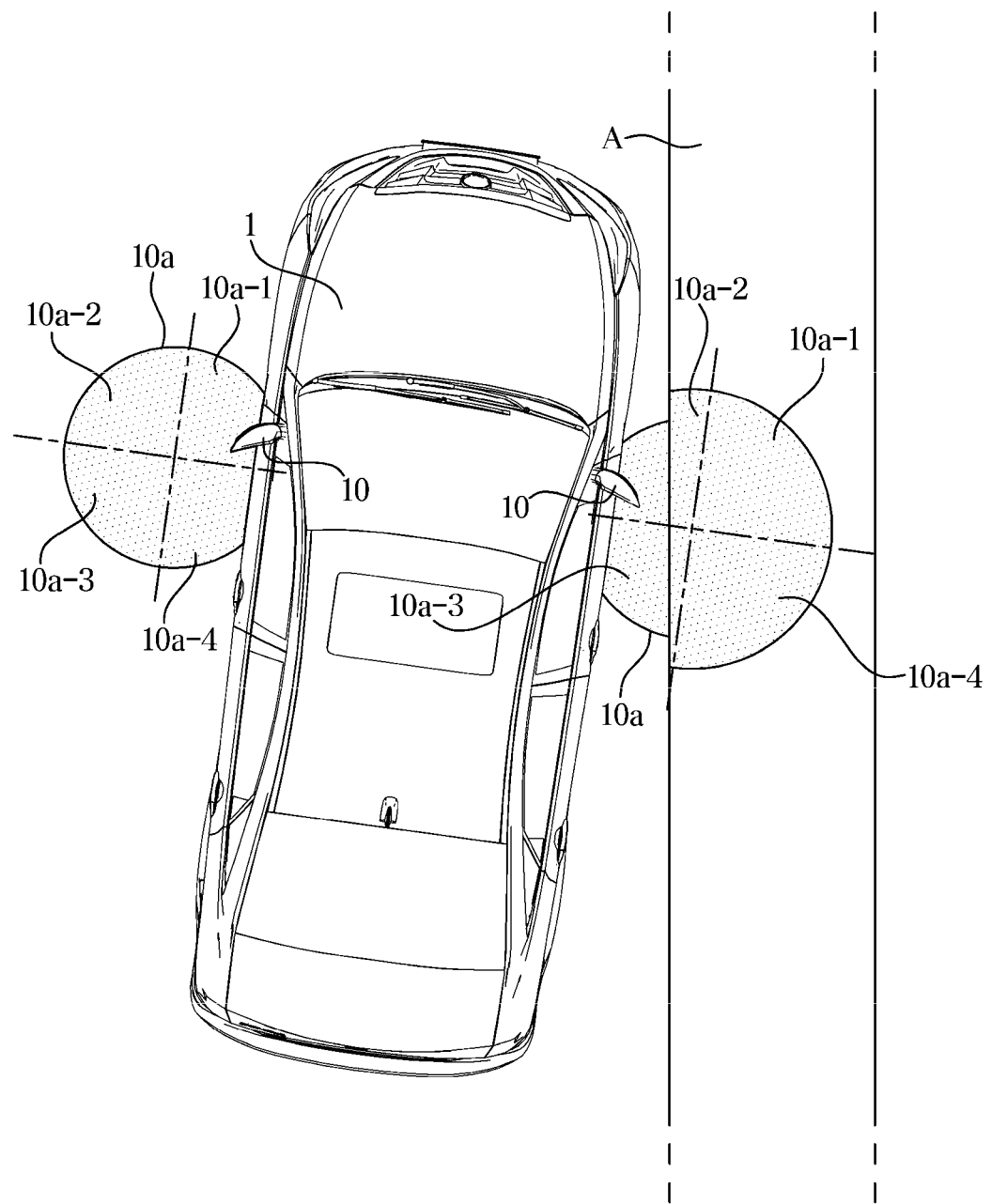
FIG. 8 and FIG. 9 illustrate that a relative position of the vehicle is determined according to the lighting region of the puddle lamp.
Figure 9:
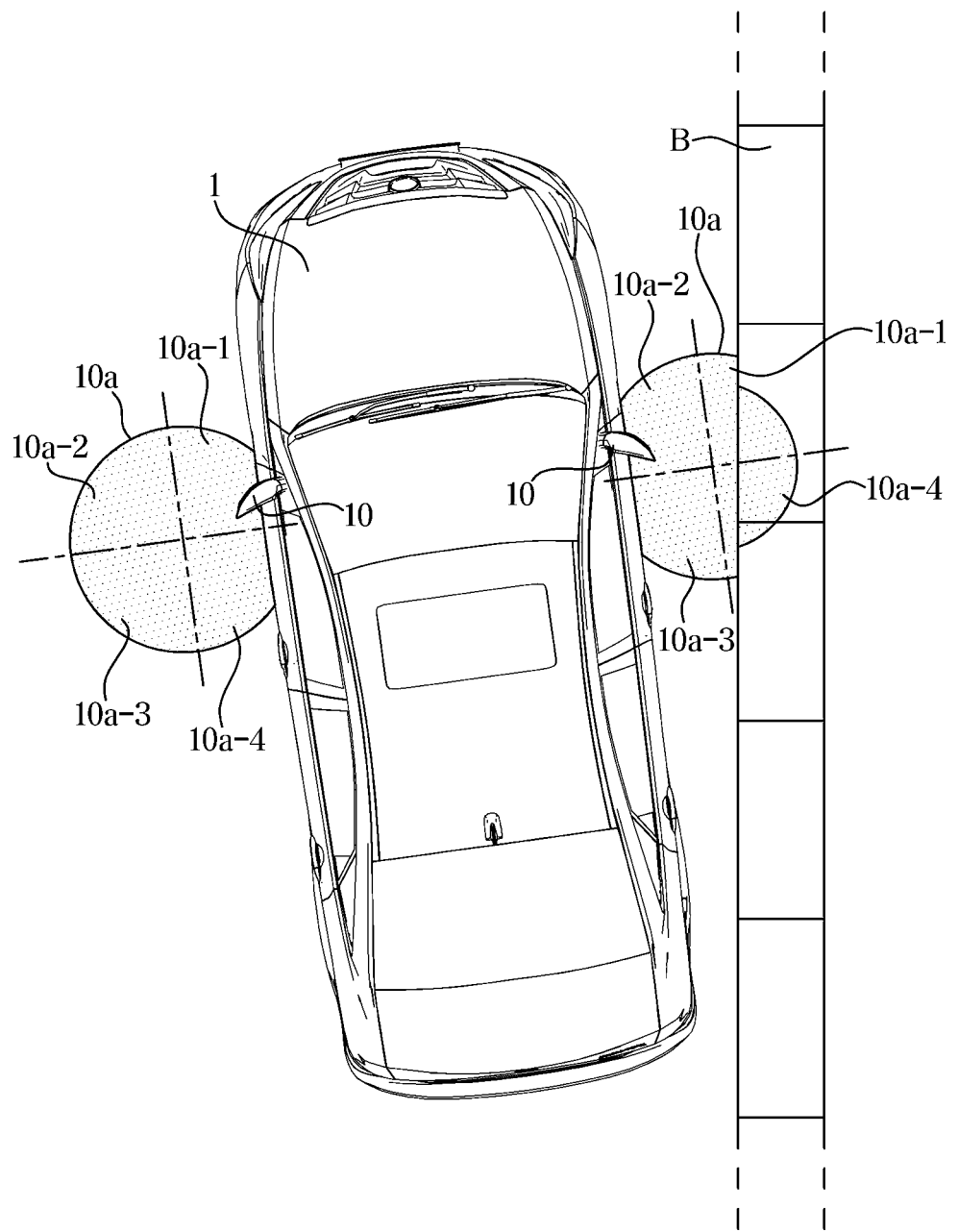

FIG. 8 and FIG. 9 illustrate that a relative position of the vehicle is determined according to the lighting region of the puddle lamp.

Referring to FIG. 8, the controller 100 may divide the lighting region 10a irradiated to the ground from the puddle lamp 11 into a predetermined number and may determine a relative position of the vehicle 1 with respect to at least one of the drain way A and the cliff A based on a position of a region where the form of the lighting region is not obtained by the camera 12 among the divided regions.

As illustrated in FIG. 8, the controller 100 may divide the lighting region 10a irradiated from the puddle lamp 11 into four of regions 10a-1, 10a-2, 10a-3, and 10a-4, and may determine a relative position of the vehicle 1 with respect to the drain way A or the cliff A according to a position of a region where the form of the lighting region is not obtained by the camera 12 among four of the divided regions 10a-1, 10a-2, 10a-3, and 10a-4.

Referring to FIG. 8, the camera 12 may obtain lighting regions of the second region 10a-2 and the third region 10a-3 among four of the divided regions 10a-1, 10a-2, 10a-3, and 10a-4, and may not obtain lighting regions of the first region 10a-1 and the fourth region 10a-4.

Furthermore, the camera 12 may obtain only some lighting regions for the second region 10a-2 and the third region 10a-3.

That is, in the lighting irradiated from the puddle lamp 11, the lighting of the first region 10a-1, a portion of the second region 10a-2, a portion of the third region 10a-3, and the fourth region 10a-4 is irradiated to the drain way A or the cliff A, and thus the camera 12 may obtain only some lighting regions of the second region 10a-2 and the third region 10a-3.

Therefore, in the instant case, the controller 100 may determine that a front portion of the vehicle 1 is closely adjacent to the drain way A or the cliff A based on the position of the lighting region 10a obtained by the camera 12.

As the position of the lighting region obtained by the camera 12 changes with respect to the lighting region 10a irradiated from the puddle lamp 11, the controller 100 may differently determine the relative position of the vehicle 1 with respect to at least one of the drain way A and the cliff A.

Referring to FIG. 9, the controller 100 may divide the lighting region 10a irradiated to the ground from the puddle lamp 11 into the predetermined number and may determine a relative position of the vehicle 1 with respect to at least one of the curb B and the obstacle B based on a position of a region where the form of the lighting region obtained by the camera 12 is distorted among the divided regions.

As illustrated in FIG. 9, the controller 100 may divide the lighting region 10a irradiated from the puddle lamp 11 into four of the regions 10a-1, 10a-2, 10a-3, and 10a-4, and may determine a relative position of the vehicle 1 with respect to the curb B or the obstacle B according to the position at which the form of the lighting region obtained by the camera 12 is distorted among four of the divided regions 10a-1, 10a-2, 10a-3, and 10a-4.

Referring to FIG. 9, the camera 12 may obtain lighting regions of the first region 10a-1 and the fourth region 10a-4 which are obtained smaller than the areas of the second region 10a-2 and the third region 10a-3 among four of the divided regions 10a-1, 10a-2, 10a-3, and 10a-4.

That is, because the lighting of the first region 10a-1 and the fourth region 10a-4 among four of the lighting regions 10a-1, 10a-2, 10a-3, and 10a-4 which are irradiated from the puddle lamp 11 is irradiated to the curb B or the obstacle B, the camera 12 may obtain the lighting regions of the first region 10a-1 and the fourth region 10a-4 which are distorted smaller than the areas of the second region 10a-2 and the third region 10a-3.

Therefore, in the instant case, the controller 100 may determine that a rear portion of the vehicle 1 is closely adjacent to the curb B or the obstacle B based on the position of the distorted lighting region 10a obtained by the camera 12.

That is, as the position of the distorted lighting region obtained by the camera 12 changes with respect to the lighting region 10a irradiated from the puddle lamp 11, the controller 100 may differently determine the relative position of the vehicle 1 with respect to at least one of the curb B and the obstacle B.

Figure 10:
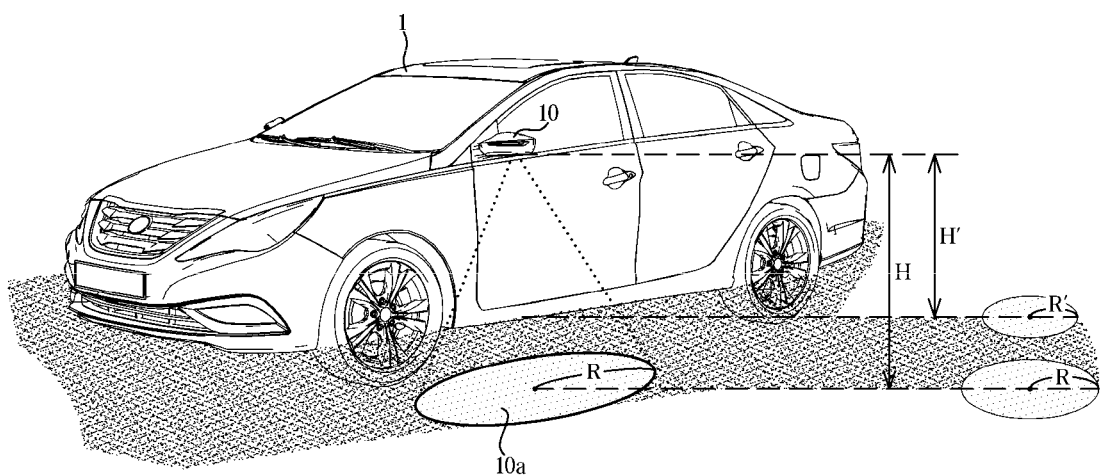
FIG. 10 illustrates that the lighting regions irradiated from the puddle lamp are differently obtained when snow is accumulated according to an exemplary embodiment of the present invention.

FIG. 10 illustrates that the lighting regions irradiated from the puddle lamp are differently obtained when snow is accumulated according to an exemplary embodiment of the present invention.

Referring to FIG. 10, when snow is accumulated at a position where the vehicle 1 is to be parked, the area of the lighting region of the puddle lamp 11 obtained by the camera 12 may be obtained with an area smaller than the predetermined area.

That is, as described with reference to FIG. 5, when the lighting irradiated from the puddle lamp 11 is irradiated on curb or an obstacle higher than the ground, the lighting irradiated to the curb or the obstacle may be displayed as a form with a smaller area than the predetermined form.

Likewise, when snow accumulates at a position where the lighting is irradiated from the puddle lamp 11, because the position where snow is accumulated is higher than the ground, the lighting irradiated to the place where snow is accumulated may be displayed as a form with a smaller area than the predetermined form.

Referring to FIG. 10, when the height of the puddle lamp 11 provided on the side mirror 10 of the vehicle 1 is H, the distance from the puddle lamp 11 to the lighting 10a irradiated to the ground is also H and the radius of the lighting 10a becomes R, and when the lighting 10a irradiated from the puddle lamp 11 is irradiated to the place where snow is accumulated, the distance from the puddle lamp 11 to the lighting 10a becomes H' and closer to H, so that the radius of the lighting 10a becomes R' which is smaller than R.

Accordingly, the controller 100 may determine the form of the ground to which the lighting 10a is irradiated based on the area or information on the form of the region of the lighting 10a of the puddle lamp 11 obtained by the camera 12.

As described above, according to the vehicle 1 and the control method thereof according to an exemplary embodiment of the present invention, when the vehicle 1 is to be parked, a drain way, a cliff, curb or an obstacle on the side of the vehicle 1 may be detected using lighting irradiated from the puddle lamp 11 to warn the driver or to control the behavior of the vehicle 1, so that the vehicle 1 may be parked safely and accurately.

The disclosed exemplary embodiments may be implemented in a form of a recording medium storing instructions executable by a computer. The instructions may be stored in a form of program code, and when executed by a processor, a program module may be generated to perform the operations of the included exemplary embodiments. The recording medium may be implemented as a computer-readable recording medium.

The computer-readable recording medium includes various types of recording media in which instructions which may be decrypted by a computer are stored. For example, there may be a ROM (Read Only Memory), a RAM (Random Access Memory), a magnetic tape, a magnetic disk, a flash memory, an optical data storage device, and the like.

As is apparent from the above, the present invention has an effect of parking a vehicle safely and accurately by detecting a drain way, a cliff, curb or an obstacle on the side of the vehicle to warn a driver or to control the behavior of the vehicle using lighting irradiated from a puddle lamp during parking the vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
a lamp configured to irradiate lighting to a ground;
a camera configured to capture an image of the lighting irradiated to the ground to obtain information on a form of the lighting of the lamp; and
a controller configured to determine at least one of the form of the ground to which the lighting is irradiated and whether an obstacle exists on the ground to which the lighting is irradiated, based on the information on the obtained form of the lighting of the lamp,
wherein the lamp is configured to irradiate the lighting to the ground in a predetermined form,
wherein the controller is configured to determine that the form of the ground to which the lighting of a region which is not obtained is irradiated is the obstacle when the form of the obtained lighting of the lamp is a portion of a region of the predetermined form and a form of a remaining lighting region of the lighting except the portion of the region is not obtained, and wherein the controller warns a driver of the vehicle through an informer or controls braking of the vehicle when the obstacle is detected during parking.

2. The vehicle according to claim 1,
wherein upon determining that an area of the obtained lighting of the lamp is less than or equal to a predetermined area, the controller is configured to determine that the form of the lighting of the lamp is the portion of the region of the predetermined form.

3. The vehicle according to claim 1,
wherein upon determining that the form of the obtained lighting of the lamp is distorted, the controller is configured to determine that a ground form of a distorted lighting region is at least one of a curb and the obstacle and a position of at least one of the curb and the obstacle is higher than the ground to which the lighting is irradiated.

4. The vehicle according to claim 3,
wherein upon determining that the form of the obtained lighting of the lamp is divided by the at least one of the curb and the obstacle and lengths of points at which divided regions of the lighting intersect the curb or the obstacle are different from each other, the controller is configured to determine that predetermined regions of the lighting irradiated from the lamp are irradiated to the ground and remaining regions except the predetermined regions are irradiated to the curb or the obstacle so that the form of the lighting is distorted.

5. The vehicle according to claim 1,
wherein the controller is configured to divide the lighting region irradiated to the ground into a predetermined number and is configured to determine a relative position of the vehicle with respect to at least one of a drain way and a cliff based on a position of a region where the form of the lighting region is not obtained among the divided regions.

6. The vehicle according to claim 3,
wherein the controller is configured to divide the lighting region irradiated to the ground into a predetermined number and is configured to determine a relative position of the vehicle with respect to at least one of the curb and the obstacle based on a position of a region where the form of the lighting region is distorted among the divided regions.

7. The vehicle according to claim 1,
wherein upon determining that the form of the obtained lighting of the lamp coincides with the predetermined form, the controller is configured to determine that the form of the ground to which the lighting is irradiated is a general road.

8. The vehicle according to claim 1, wherein the lamp and the camera are mounted on a side mirror of the vehicle.

9. A vehicle control method comprising:
irradiating lighting of a lamp to a ground;
photographing the lighting irradiated to the ground to obtain information on a form of the lighting of the lamp;
determining, by a controller, at least one of a form of the ground to which the lighting is irradiated and whether an obstacle exists on the ground to which the lighting is irradiated, based on the information on the obtained form of the lighting of the lamp; and
controlling an informer to generate a warning signal when the obstacle is detected during parking or controlling braking of the vehicle;

wherein the irradiating of the lighting to the ground includes irradiating the lighting to the ground in a predetermined form, and wherein the determining of the form of the ground to which the lighting is irradiated includes determining that the form of the ground to which the lighting of a region which is not obtained is irradiated is at least one of a drain way and a cliff when the form of the obtained lighting of the lamp is a portion of a region of the predetermined form and a form of a remaining lighting region of the lighting except the portion of the region is not obtained.

10. The vehicle control method according to claim 9,
wherein upon determining that an area of the obtained lighting of the lamp is less than or equal to a predetermined area, the form of the lighting of the lamp is determined to be a portion of the region of the predetermined form.

11. The vehicle control method according to claim 9,
wherein the determining of whether the obstacle exists on the ground to which the lighting is irradiated includes determining that when the form of the obtained lighting of the lamp is distorted, a ground form of a distorted lighting region is at least one of a curb and the obstacle and a position of the at least one of the curb and the obstacle is higher than the ground to which the lighting is irradiated.

12. The vehicle control method according to claim 11,
wherein the determining that the form of the lighting is distorted includes determining that when the form of the obtained lighting of the lamp is divided by the at least one of the curb and the obstacle and lengths of points at which the divided regions of the lighting intersect the curb or the obstacle are different from each other, predetermined regions of the lighting irradiated from the lamp are irradiated to the ground and remaining regions other than the predetermined regions are irradiated to the curb or the obstacle so that the form of the lighting is distorted.

13. The vehicle control method according to claim 9, further including:
dividing the lighting region irradiated to the ground into a predetermined number,
wherein a relative position of a vehicle with respect to at least one of the drain way and the cliff is determined based on a position of a region where the form of the lighting region is not obtained among the divided regions.

14. The vehicle control method according to claim 11, further including:
dividing the lighting region irradiated to the ground into a predetermined number,
wherein a relative position of a vehicle with respect to at least one of the drain way and the cliff is determined based on a position of a region where the form of the lighting region is distorted among the divided regions.

15. The vehicle control method according to claim 9,
wherein upon determining that the form of the obtained lighting of the lamp coincides with the predetermined form, the form of the ground to which the lighting is irradiated is determined to be a general road.

16. The vehicle control method according to claim 13,
wherein the vehicle includes:

a lamp configured to irradiate the lighting to the ground; and a camera configured to capture an image of the lighting irradiated to the ground to obtain the information on the form of the lighting of the lamp, wherein the lamp and the camera are mounted on a side mirror of the vehicle.

17. The vehicle control method according to claim 14, wherein the vehicle includes:

a lamp configured to irradiate the lighting to the ground; and a camera configured to capture an image of the lighting irradiated to the ground to obtain the information on the form of the lighting of the lamp, wherein the lamp and the camera are mounted on a side mirror of the vehicle.

\* \* \* \* \*